United States Patent [19]
Brambilla

[11] Patent Number: 5,124,096
[45] Date of Patent: Jun. 23, 1992

[54] EXTRUSION HEAD FOR FOAMED MATERIAL, IN PARTICULAR FOR POLYVINYLCHLORIDE-BASED FOAMED MATERIAL

[75] Inventor: Romano Brambilla, Modena, Italy

[73] Assignee: Brabor S.r.l., Ubersetto Di Fiorano, Italy

[21] Appl. No.: 513,211

[22] Filed: Apr. 23, 1990

[30] Foreign Application Priority Data

Apr. 28, 1989 [IT] Italy ................. 20301 A/89

[51] Int. Cl.$^5$ .................. B29C 67/22; B29C 47/12
[52] U.S. Cl. ....................... 264/45.5; 264/45.9; 425/4 C; 425/467; 425/817 C; 425/192 R
[58] Field of Search .............. 264/45.9, 46.1, 53, 264/54, 45.5; 425/4 C, 817 C, 461, 197, 467, 192 C

[56] References Cited

U.S. PATENT DOCUMENTS

| | | | |
|---|---|---|---|
| 3,413,388 | 11/1968 | Lux et al. | 264/46.1 |
| 3,713,762 | 1/1973 | Oisugu | 425/197 |
| 3,764,642 | 10/1973 | Boutillier | 264/46.1 |
| 3,857,914 | 12/1974 | Aishima et al. | 264/46.1 |
| 3,941,544 | 3/1976 | Barth | 425/461 |
| 3,993,721 | 11/1976 | Soda et al. | 264/45.9 |
| 4,192,839 | 3/1980 | Hayashi et al. | 264/46.1 |
| 4,362,683 | 12/1982 | Otsuka et al. | 425/467 |

FOREIGN PATENT DOCUMENTS

| | | | |
|---|---|---|---|
| 48-18950 | 6/1973 | Japan | 264/45.9 |
| 48-40068 | 11/1973 | Japan | 264/46.1 |

Primary Examiner—Jeffery Thurlow
Attorney, Agent, or Firm—Guido Modiano; Albert Josif

[57] ABSTRACT

The extrusion head has a body which accommodates a male element and which defines, in co-operation with the male element, a passage for the material to be extruded. The passage extends around the male element and leads outward through an extrusion hole located proximate to an end of the head. The end of the male element which is orientated in the direction of flow of the material has at least one channel through which material is delivered inside the flow of material which flows out of the extrusion hole.

4 Claims, 2 Drawing Sheets

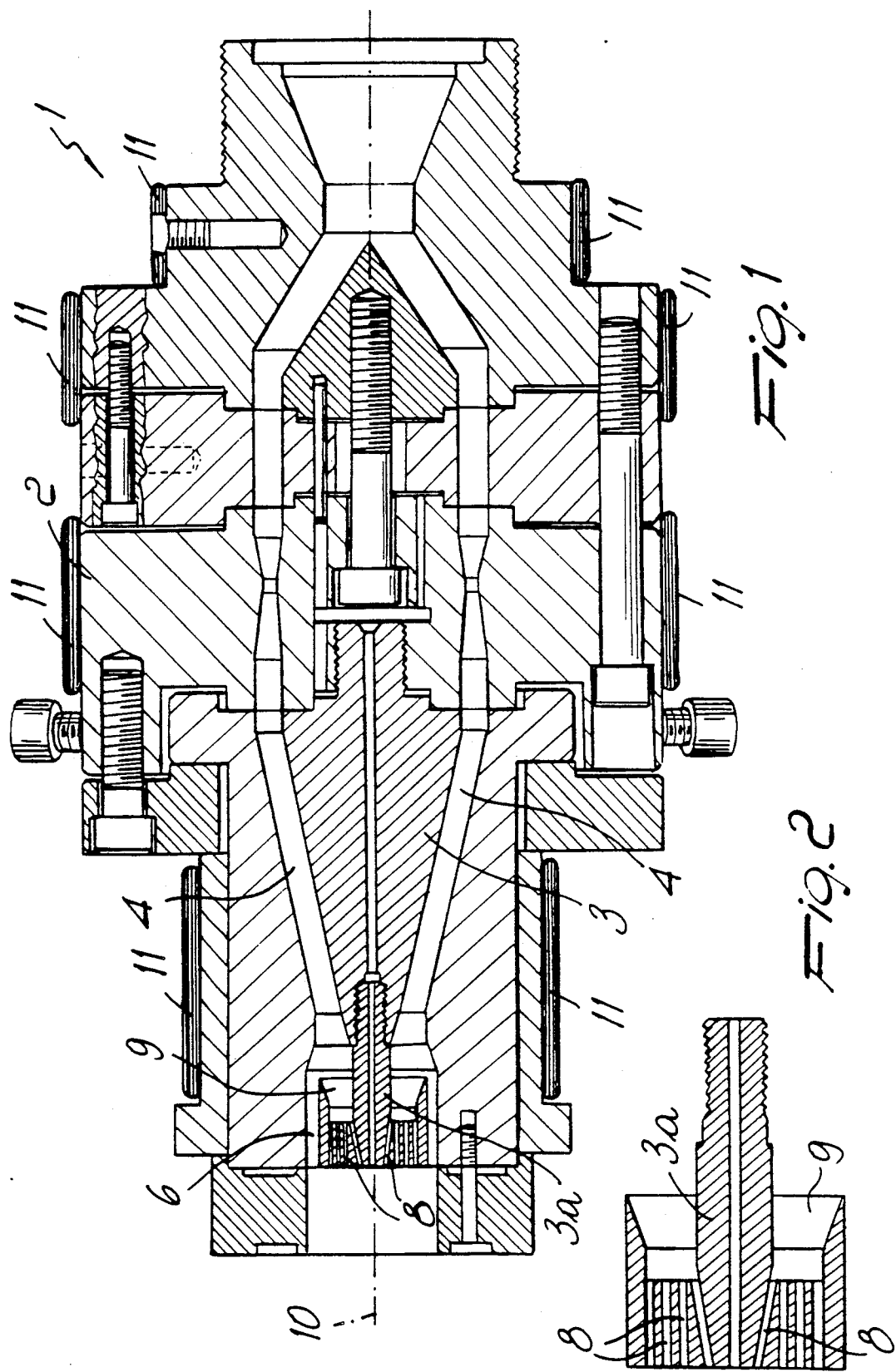

EXTRUSION HEAD FOR FOAMED MATERIAL, IN PARTICULAR FOR POLYVINYLCHLORIDE-BASED FOAMED MATERIAL

BACKGROUND OF THE INVENTION

The present invention relates to an extrusion head for foamed material, in particular for polyvinylchloride-based foamed material.

Extrusion heads for formed material, for example for PVC with the addition of substances which causes its foaming, are known which substantially comprise a head body with elongated configuration in which a longitudinal cavity is defined; an element known as a "male" element is accommodated in said longitudinal cavity. Said male element defines, in co-operation with the internal walls of the cavity in which it is contained, a passage for the material which is pushed, with a present pressure, along said passage in the semi-liquid or pasty state.

The passage for the material leads outward at a longitudinal end of the head through an extrusion hole which is shaped correspondingly to the configuration of the extruded element to be obtained.

During extrusion, the material foams and the extruded element assumes its final configuration, which is stabilized during cooling by making said extruded element pass through "gauges" which are substantially constituted by cooled blocks in which a through cavity is defined which reproduces the profile of the extruded element to be obtained. In some cases this cavity is kept at negative pressure so as to improve the outer profile of the extruded element, achieving a high degree of finish.

Said known types of extrusion head allow to obtain extruded elements with a hollow cross section with good results, but have some disadvantages in the execution of solid cross-section extruded elements.

Great difficulty in execution is in fact encountered if an extruded element with solid cross is to be obtained with know extrusion heads, for example if the extruded element must have good mechanical resistance substantially through its entire thickness.

It is indeed very difficult to obtain a solid cross-section extruded element by increasing the thickness of the walls of said extruded element at its exit from the extrusion hole, i.e. by reducing the dimensions of the end of the male element which faces said hole; on the contrary, a cavity is very often always present at the center of the extruded elements. This effect derives from the fact that the material tends to foam more easily toward the outer surface of the extruded element and with great difficulty toward its center.

Even when the outer surface of the extruded element has set, the internal layers of the material tend in any case to foam from the inside outward and not vice versa.

This behavior of the material furthermore produces a high density of the extruded element proximate to its outer surface and a reduced density proximate to its center.

In order to obtain a solid cross-section extruded element with conventional extrusion heads it is necessary to considerably increase the thickness of the extruded element exiting from the extrusion head, with the disadvantages of using a considerable amount of material, most of which, at the end of extrusion, is practically not formed proximate to the outer surface of the extruded element.

SUMMARY OF THE INVENTION

The aim of the present invention is to solve the above described problems by providing an extrusion head for formed material which allows to obtain extruded products with solid cross section, eliminating waste of material.

Within the scope of this aim, an object of the invention is to provide an extrusion head which allows to fully exploit the foaming potentiality of the material in accordance with the density required for the extruded element to be produced.

Another object of the invention is to provide an extrusion head which can be obtained in a simple manner from conventional extrusion heads by means of modifications which entail modest amounts of time and costs for their execution.

This aim, these objects and others which will become apparent hereinafter are achieved by an extrusion head for foamed material, in particular for polyvinlychloride-based foamed material, which comprises a head body which accommodates a male element and defines, in co-operation with said male element, a passage for the material to be extruded which extends around said male elements and leads outward through an extrusion hole located proximate to an end of said head, characterized in that the end of said male element which is orientated in the direction of flow of the material has at least one channel for delivering material inside the flow of material which flows out of said extrusion hole.

BRIEF DESCRIPTION OF THE DRAWINGS

Further characteristics and advantages of the invention will become apparent from the description of a preferred but not exclusive embodiment of the extrusion head according to the invention, illustrated only by way of non-limitative example in the accompanying drawings, wherein:

FIG. 1 is a longitudinal sectional view of the extrusion head according to the invention;

FIG. 2 is an enlarged view of a detail of FIG. 1;

DESCRIPTION OF THE PREFERRED EMBODIMENTS

Figure 3:
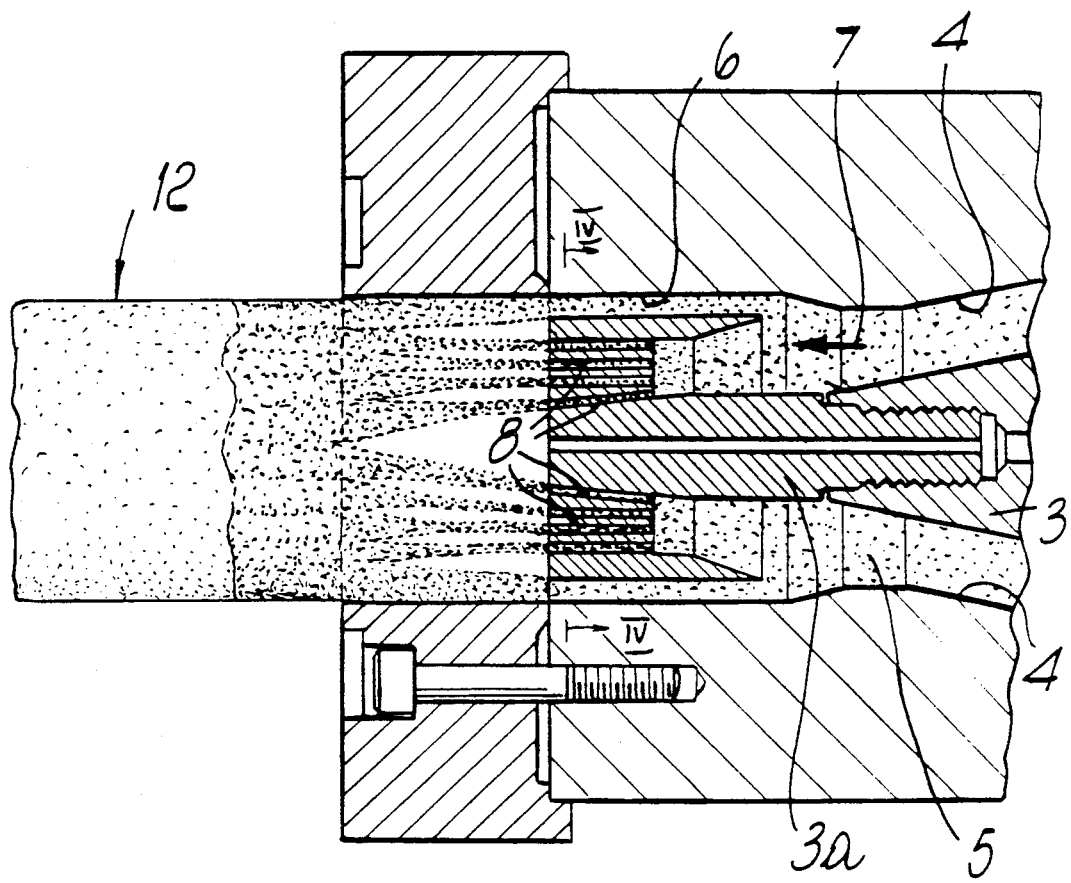
FIG. 3 is a sectional view of the extrusion head, similar to FIG. 1 proximate to the extrusion hole during its operation.
Figure 4:
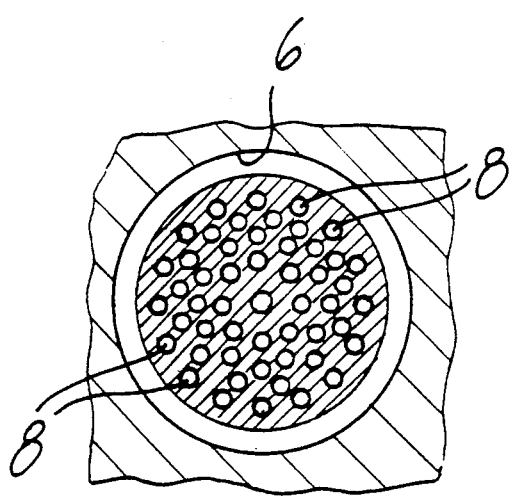
FIG. 4 is a sectional view of FIG. 3 taken along the axis IV—IV.

With reference to the above figures, the extrusion head according to the invention, generally indicated by the reference numeral 1, comprises a head body 2 inside which a cavity is defined; a male element 3 is accommodated in said cavity in a known manner. Said male element 3 defines, in co-operation with the internal walls of the cavity of the head body in which it is accommodated, a passage 4 which extends around the male element 3 and along which the material 5 to be extruded is pushed; said material can be constituted for example by PVC with the addition of known substances which cause it to foam.

The passage 4, which extends longitudinally in the extrusion head, leads outward through an extrusion hole 6 located proximate to a longitudinal end of the extrusion head. Said hole, which has a circular configuration in the illustrated embodiment, may be shaped in various manners according to the configuration of the extruded element to be obtained.

According to the invention, the end 3a of the male element 3 which is orientated in the direction of flow of the material, indicated by the arrow 7, has at least one delivery channel 8 through which material is extruded internally to the flow of material which flows out of the extrusion hole.

Advantageously, the end 3a of the male element 3 which is directed toward the extrusion hole 6 has an expansion in a transverse direction with respect to the flow of material, and a feed chamber 9 is defined in said region; said chamber is open in the opposite direction to the flow of material. The inlet of one or more of the channels 8 is defined on the bottom of said feed chamber 9 opposite to its open side, so as to convey a preset amount of material through the delivery channels 8.

In the illustrated embodiment, a plurality of delivery channels 8, arranged mutually angularly spaced around the axis 10 of the male element 3, is conveniently provided.

As illustrated in FIG. 2, the end 3a of the male element in which the feed chamber is defined can be provided as a separate element to be associated, for example by screwing, with the remaining part of the male element 3 in replacement of conventional point.

For the sake of completeness in description, it should be noted that the remaining part of the extrusion head can be provided in a known manner, with the application of heating means constituted for example by electric resistors 11 applied to its outer surface.

The operation of the extrusion head according to the invention is as follows.

The material, in the semi-liquid or pasty state, is pushed, with a preset pressure, along the passage 4 toward the extrusion hole 6. Due to the presence of the male element 3, the material exits from the extrusion hole 6 with a configuration having a hollow cross section, inside which more material in the semi-liquid or pasty state is extruded through the channels 8.

Figure 5:
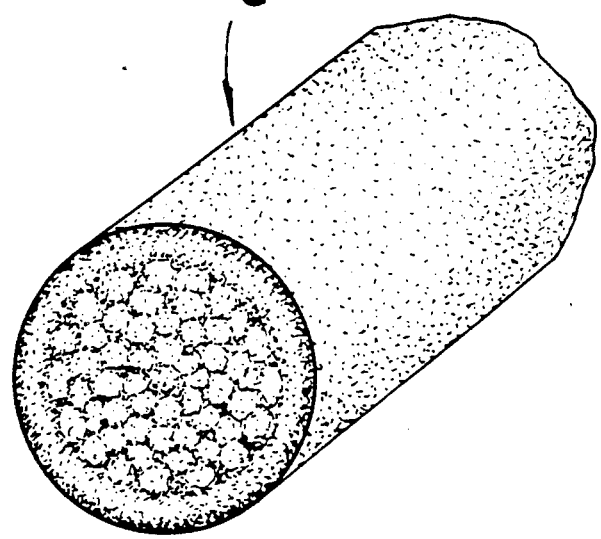
FIG. 5 is a view of a solid cross-section extruded element obtained with the extrusion head according to the invention.

At the exit from the extrusion hole 6, the material completes its foaming and the surface material sets, whereas the material extruded through the channels 8 continues to foam until it completely fills the cavity of the extruded body 12, as illustrated in FIG. 5.

It should be noted that the material extruded through the channels 8 foams from the inside outward and therefore the cross section of the extruded body is filled by exploiting the natural tendency of the material, not, as occurs in the conventional method in which the filling of the hollow cross section of the extruded hollow body is sought by increasing the thickness of the walls of the extruded hollow body, by exploiting an inward foaming which is much smaller, in percentage, than the foaming in the opposite direction.

The fact that the hollow cross section of the extruded element is filled by exploiting the natural tendency of the material to foam outward not only ensures the obtainment of a solid extruded body but also allows to obtain, by appropriately defining the dimensions of the extrusion hole 6 and the end 3a of the facing male element and by calculating the number and diameter of the channels 8, an excellent uniformity in the density of the material inside the extruded body, avoiding excessive accumulations of material in the surface region.

In practice it has been observed that the extrusion head according to the invention fully achieves the intended aim, since by virtue of the delivery channels defined in the male element, solid cross-section extruded elements are obtained in a simple manner.

Another advantage is that it is possible to fully exploit the foaming potentialities of the material, avoiding waste and therefore reducing production cost for this kind of extruded element.

A further advantage is that is possible to obtain, if required, extruded elements with a density which can be diversified in a preset manner in the various regions of its cross section simply by appropriately placing and defining the dimensions of the delivery channels defined in the male element.

Although the extrusion head has been described for the execution of an extruded element with cylindrical configuration, extruded elements with any profile can obviously be obtained by appropriately shaping the extrusion hole, the delivery channels and the related male element.

The extrusion head thus conceived is susceptible to numerous modifications and variations, all of which are within the scope of the inventive concept; all the details may furthermore be replaced with technically equivalent elements.

In practice, the materials employed, so long as compatible with the specific use, as well as the dimensions, may be any according to the requirements and to the state of the art.

We claim:

1. Extrusion head for foamed material, in particular for polyvinlychloride-based foamed material, comprising a head body means which accommodates a male element and which defines, in co-operation with said male element means, a passage means for the formed material to be extruded, said passage means extending around said male element means and leading outward through an extrusion hole means, wherein said male element means comprises a plurality of channel means for the delivery of foamed material inside the flow of foamed material which flows out of said extrusion hole means, said male element means defining an end which is orientated in the direction of flow of the formed material, said end of said male element being provided with said plurality of channel means, each of said plurality of channel means defining an inlet means connected to said passage means and an outlet means arranged inside said extrusion hole means, said male element means having a longitudinal axis which extends substantially in the direction of the flow of foamed material, said plurality of channel means being arranged between said passage means and said longitudinal axis of said male element means.

2. Extrusion head according to claim 1, wherein said male element means has, immediately upstream of the inlet means along the direction of the flow of foamed material, an expansion in a transverse direction with respect to the flow of foamed material, a feed chamber means being defined therein and being open in the opposite direction with respect to the direction of flow of the foamed material and leading out, on the opposite side, into said inlet means of said plurality of channel means.

3. Process for the extrusion of foamed material for the production of solid cross-section extruded elements, wherein a hollow body is extruded through a passage means and outward through an extrusion hole means which externally reproduces the configuration of the object to be obtained and wherein material is extruded in said hollow body during extrusion through a plurality of channel means which are arranged inside said passage means and which communicate between said passage means and said extrusion hole means, said material filling said hollow body by foaming.

4. Extrusion head according to claim 1, wherein said end of said male element means is a separate element which is connectable to said male element means by means of screwing.

* * * * *